United States Patent
Oliver et al.

(10) Patent No.: US 7,536,471 B2
(45) Date of Patent: *May 19, 2009

(54) USE OF NODES TO MONITOR OR MANAGE PEER TO PEER NETWORKS

(75) Inventors: Huw Edward Oliver, Bristol (GB); Simon Edwin Crouch, Bristol (GB); Johannes Maria V Daanen, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 707 days.

This patent is subject to a terminal disclaimer.

(21) Appl. No.: 10/815,512

(22) Filed: Apr. 1, 2004

(65) Prior Publication Data

US 2005/0053000 A1  Mar. 10, 2005

(30) Foreign Application Priority Data

Apr. 5, 2003  (GB)  ................................. 0307909.2

(51) Int. Cl.
 *G06F 15/16* (2006.01)
(52) U.S. Cl. .................. 709/232; 709/231; 709/225; 709/216; 709/217; 709/223; 709/249; 370/231; 370/395.2
(58) Field of Classification Search .......... 709/230, 709/201, 217, 223, 227, 245, 249, 250, 200, 709/232, 231, 225, 216; 370/395.2, 231
See application file for complete search history.

(56) References Cited

U.S. PATENT DOCUMENTS 7,127,613 B2 * 10/2006 Pabla et al. ................ 713/171
7,137,145 B2 * 11/2006 Gleichauf .................... 726/24
2002/0062336 A1  5/2002 Teodosiu et al. ............ 709/201
2002/0062375 A1  5/2002 Teodosiu et al. ............. 709/26
2003/0055894 A1  3/2003 Yeager et al. ............... 709/204

FOREIGN PATENT DOCUMENTS

| EP | 1 282 289 | 2/2003 |
|---|---|---|
| EP | 1 298 854 | 4/2003 |
| GB | 2 380 830 | 4/2003 |
| WO | WO 96/07257 | 3/1996 |
| WO | WO 01/63520 | 8/2001 |

(Continued)

OTHER PUBLICATIONS

Philippe Golle (Incentives for Sharing in Peer-to-Peer Networks, 2001, Computer Science Department, Stanford University).*

(Continued)

*Primary Examiner*—Ricky Ngo
*Assistant Examiner*—Kibrom T Hailu

(57) ABSTRACT

A method for controlling a computer entity to participate in a peer to peer network of a plurality of computer entities comprises, for each computer entity, operating a peer to peer protocol for enabling the computer entity to utilise resources of at least one other computer entity of the network, and for enabling at least one other computer entity of the network to utilise resources of the computer entity. Each computer entity is arranged to automatically operate a process for managing at least one other computer entity in the network, whenever the computer entity takes part in the peer to peer network using the peer to peer protocol.

7 Claims, 9 Drawing Sheets

FOREIGN PATENT DOCUMENTS

| | | |
|---|---|---|
| WO | WO 02/15035 | 2/2002 |
| WO | WO 02/29551 | 4/2002 |
| WO | WO 02/37943 | 5/2002 |
| WO | WO 03/014955 | 2/2003 |
| WO | WO 03/036444 | 5/2003 |
| WO | WO 2004/010346 | 1/2004 |

OTHER PUBLICATIONS

Shen (Adaptive Autonomous Management of Ad hoc Network, 2002 IEEE).*

Golle (Incentives for Sharing in Peer-to-Peer Networks, 2001, Computer Science Department, Stanford University).*

Great Britain Search Report, Application No. GB0307909.2, dated Nov. 25, 2003.

* cited by examiner

| Computer entity | | | | | | | |
|---|---|---|---|---|---|---|---|
| Internet address no | User account no | Property 1 | Property 2 | ............ | Property N | Policy 1 | Policy 2.....Policy N |
| Peer 1 | | | | | | | |
| Peer 2 | | | | | | | |
| Peer M | | | | | | | |

Fig. 8

USE OF NODES TO MONITOR OR MANAGE PEER TO PEER NETWORKS

FIELD OF THE INVENTION

The present invention relates to the field of computer science, and particularly although not exclusively, to peer to peer networks of connected computer entities.

BACKGROUND TO THE INVENTION

Known prior art computer networks comprise a plurality of interconnected computer entities. In the prior art, in order to manage prior art computer networks, network management systems have relied on centralisation of information at a management station. A management station can comprise one or more computer entities each provided with a management system allowing a human user to view a screen at which the whole network, or sections of the network are represented graphically as a set of nodes and links, and at which a set of parameters of a plurality of individual computers can be examined at the centralised management station. One or more human operators apply network management policies in order to perform network management operations such as configuring the network, detecting and repairing faults in the network, undertaking network accounting, optimising performance of the network, and enforcing security.

Examples of prior art computer network management systems include the known HP Open View network management system.

Another type of prior art computer network comprises a peer to peer network. In a peer to peer network, a plurality of computer entities communicate with each other on an equal basis. There is no centralised management system and no individual human network managers to apply overall control of policies for configuring the network. The nature of peer to peer networks is that they are scaleable by addition of extra peer computer entities, which when joining the network, communicate with other peer computer entities on an equivalent basis. No single computer entity has the capability to manage or monitor the whole of the peer to peer network.

One problem with prior art peer to peer networks, is that the control which a user has over their computer entity, once it has joined a peer to peer network, is very crude. The user has only a very basic control over which other computer entities can access the user's computer entity and there can arise conflicts in determining which user can access the computer entities at any one time in known peer to peer networks.

Other problems which occur in prior art peer to peer computer networks are those of users being incentivised to join a network. In particular, by joining a network the owner of a computer entity may find that their computer is being used heavily by other users, and yet those other users provide few resources in return. Computer entities which routinely use services in a peer to peer network, but rarely provide a resource are known as 'free loaders' or 'free riders'. For example, in a Napster® network, a user may routinely download music files onto their own computer, but never supply any music files on their own computer for access by other users.

It is a fundamental assumption in a peer to peer network, that each computer entity will be able to give resources to the network, as well as receive resources from the network. Any free loaders in the network therefore need to be isolated, and excluded from the network. However, in a prior art peer to peer network, since all computers are treated as equivalent by the peer to peer protocol, and there is no overall one person or computer in charge of network management, there is no mechanism for isolation of a free loader computer in a network.

SUMMARY OF THE INVENTION

According to one aspect of the present invention, there is provided a method for controlling a computer entity to participate in a peer to peer network of a plurality of computer entities, said method comprising: for each computer entity: operating a peer to peer protocol for enabling said computer entity to utilise resources of at least one other said computer entity of said network, and for enabling at least one other said computer entity of said network to utilise resources of said computer entity; and managing at least one other computer entity in said network.

Other features of specific embodiments and methods according to the invention are as described in the detailed description herein, and the scope of the invention is limited only by the features of the claims herein

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 8 illustrates schematically a database stored in a peer member for monitoring a plurality of other members of a peer to peer network.

DETAILED DESCRIPTION OF A SPECIFIC MODE FOR CARRYING OUT THE INVENTION

There will now be described by way of example a specific mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

In this specification, the term computer entity is used to encompass many types of computer including personal computers, server computers, and other computing platforms such as personal digital assistant (PDA) devices, palmtop computers, laptop computers and the like. Communications links between computers may be local area network links, wide area network links and internet links, and may be carried on a variety of technologies for example wireless connections or signals carried on local loop copper cables, or on coaxial cables.

Specific embodiments disclosed herein may enable a computer entity which is a member of a peer to peer network of computer entities, not only to provide its own resources to a network, and receive resources and services from the network, but as a background activity, to provide a network management service to the network, which may include network monitoring and monitoring of individual computers in the network.

Figure 1:
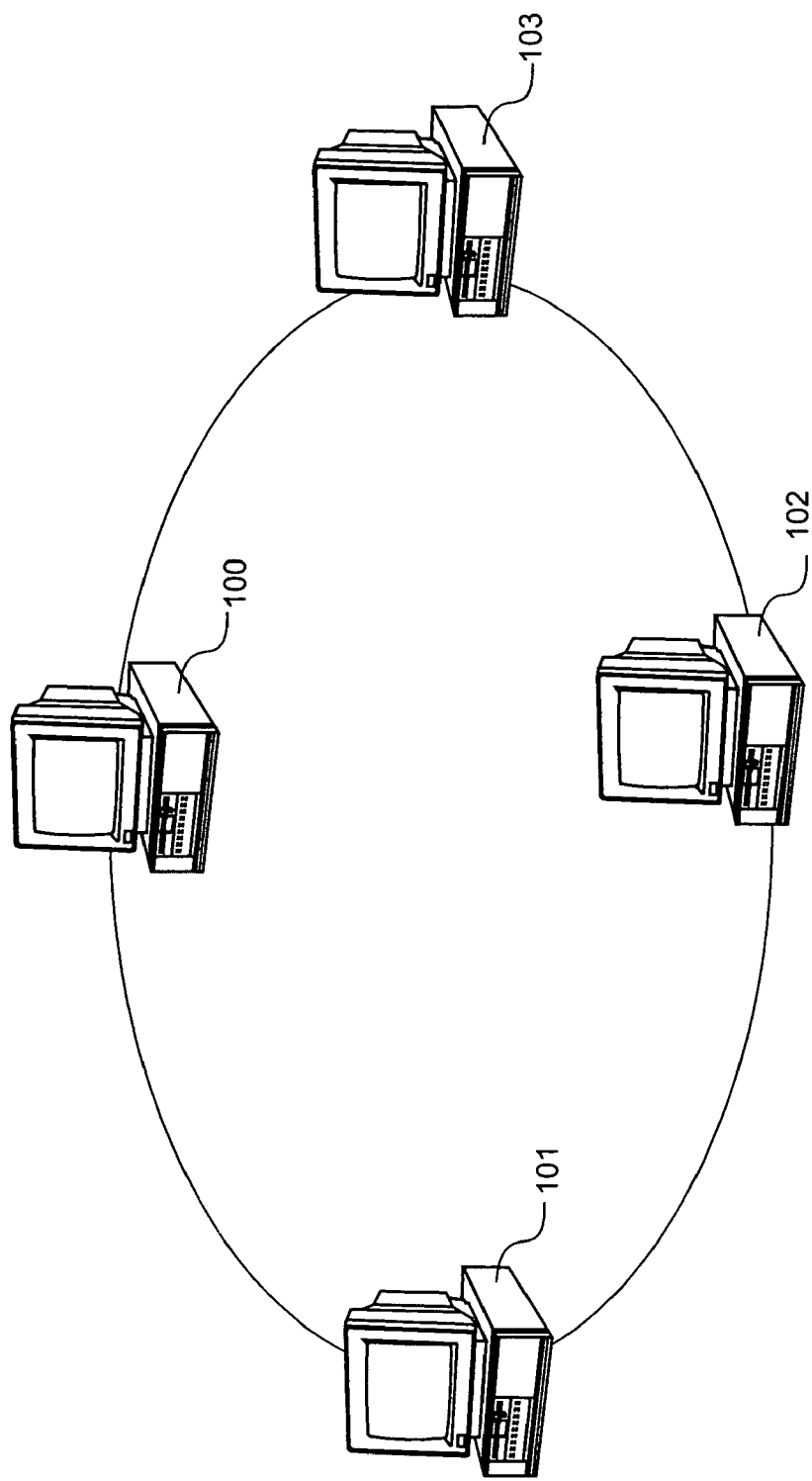
FIG. 1 illustrates schematically several computers connected using a peer to peer networking protocol according to a specific implementation of the present invention.

Referring to FIG. 1 herein, there is illustrated schematically a network of computer entities arranged on a peer to peer basis, where each computer is provided with a peer to peer protocol for interacting with other computers in the network. Each of a plurality of computer entities 100-103 communicates with one or more of the other computer entities within the network, and can act either as a client to any other computer entity in the network, and/or as a server to another computer entity. Each computer entity therefore has two modes of operation, firstly acting as a client, where for example it may access data or services stored on another computer entity in a network, or secondly acting as a server, in which case another computer entity may access data or services stored on the computer entity itself. In a general case of a peer to peer environment of connected computer entities, each computer entity represents topologically a node in a network. Connectivity between nodes can be arbitrary in the general case, with any node in the network connecting to any other node in the network.

Within a peer to peer network as described in FIG. 1 herein, each peer computer contributes resources for use by other computers, as well as consuming services of the network. During periods of inactivity, any spare resources, such as data processing capacity, data storage capacity, connectivity resource or the like, are used to perform a distributed management function according to specific embodiments. The management functionality is packaged with a peer to peer overlay protocol, and is arranged to activate when the peer to peer protocol is installed or is activated, so that the computer entity is made to operate the management activity when it joins in a peer to peer network. In a specific mode of implementation, operation of the management functionality is activated as a condition of operating the peer to peer protocol.

According to specific implementations of the present disclosed herein, a network of peer to peer connected computer entities are linked together via the peer to peer protocol. Each computer entity provides resources to the network, and is able to use resources of the network, including services provided by other computer entities in the network. During periods of inactivity, the resources provided by the computer entities are used to provide an automatic distributed network management function. During an idle period of a computer entity, the computer monitors the behaviour of one more other computer entities within the network, and contributes to the management of the one or more other computers. Monitoring and management may include the following activities:

Remote virus scanning of other computer entities n the network.

Observing group behavior in a group of computer entities within the network

Generating alert messages to alert other computer entities in the network that a particular computer entity is faulty or is misbehaving Generating virus alert messages to alert other computer entities in the network that a particular computer entity has a virus Placing a faulty computer entity into quarantine Performing a diagnosis of one or more faulty computer entities in the network.

Application of voting protocols for recovering from large network failures.

Detecting security breaches in said network.

Detecting performance problems of computers in said network.

Figure 2:
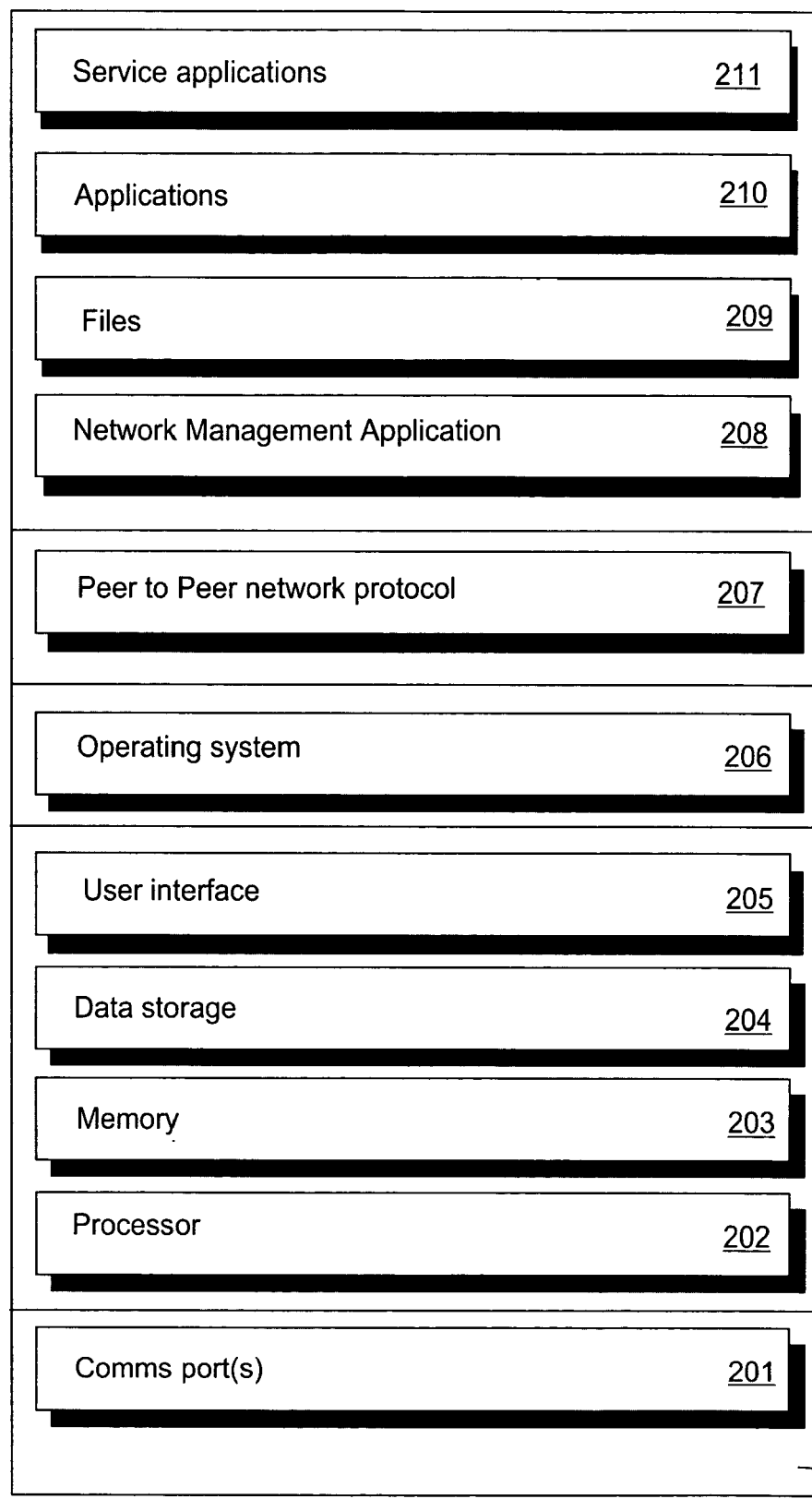
FIG. 2 illustrates schematically components of a computer entity adapted for becoming a member of a peer to peer network, and operating in accordance with a specific method of the present invention.

Referring to FIG. 2 herein, there is illustrated schematically components of a computer entity, which is a peer member of a network of peer to peer computer entities. The computer 200 comprises one or more communications ports 201 for communicating with other computer entities within the network; a data processor 202; a memory device 203; a data storage device 204, for example a hard disk data storage device or a RAID array; a user interface 205, for example comprising a visual display monitor, keyboard and pointing device such as a mouse, trackball, or the like; an operating system 206, for example Microsoft Windows, Linux, or Unix; a peer to peer network protocol layer 207 comprising a middle ware program component for applying a peer to peer network protocol, for example the known Gnutella protocol or similar; a network management application 208, as provided by a specific embodiment; a set of files 209, for example data files, mp3 files, image data files, text data files or the like which may be made available for use by one or more other computers in the network, one or a plurality of local applications 210 for providing local functionality of the computer; and one or more service applications 211 for providing a service, which can be assessed by other computers within the network.

Each computer entity has a set of resources which it can use itself, and which may be available for use by other computer entities within the network.

In this specification, the term 'resources' means any functionality provided by a computer entity. Resources may be transferable, that is downloadable to another computer entity, for example data files, application program files, or may be non-transferable, that is resources which must remain at the computer entity which provides them. Example of non-transferable resources include data processing power, data storage capacity, communications capacity or connectivity, or services which are provided by the computer entity and which are non-transferable to another computer entity.

At any time, the resources of the computer entity may be utilised to a varying extent. At some times, the computer will be in an idle state or a state of low activity, whereas at other times, the computer may be busy providing a service, processing data, or engaging in communications with other computers in the network. In particular, the utilisation of the data processing capacity, memory, communications ports and data storage, during operation of the computer, may be at a level which is low enough that those resources can be used to operate a network management service application 208 to provide a network management service on behalf of the network as a whole.

By providing a network management service to the rest of the network, as a background activity, ensures that each node provides a contribution to the network as a whole, and limits 'freeloading', since each node contributes to a network management activity which is beneficial to the community of peer computers. Further, the network management and monitoring tasks carried out includes operations of identifying and isolating freeloading computers entities within the network, as well as other activities which benefit the continuation and integrity of the network as a whole, such as limiting propagation of viruses, and limiting the effects of malfunction of individual computers.

Figure 3:
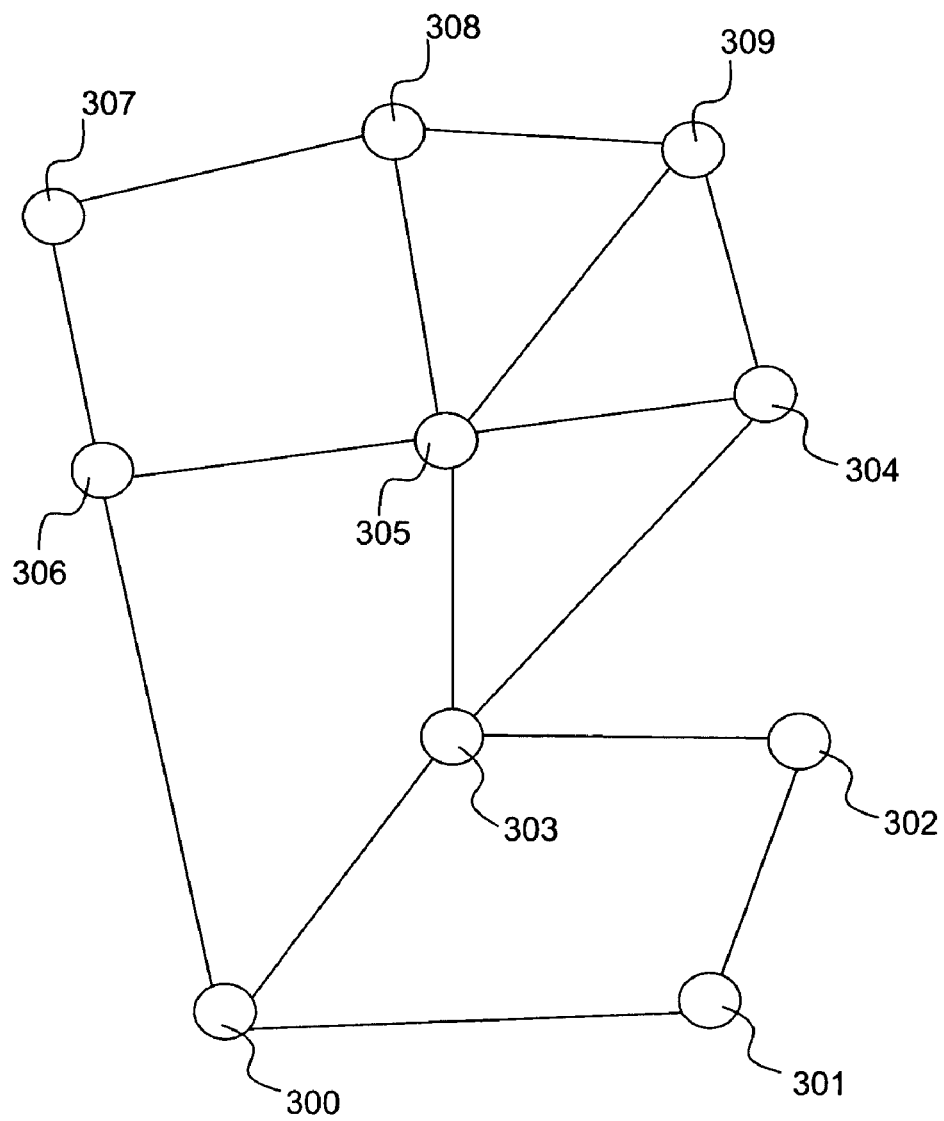
FIG. 3. illustrates schematically a network of peer to peer connected computer entities represented as a topology of nodes and links.

Referring to FIG. 3 herein, there is illustrated schematically a network of peer to peer connected computer entities 300-309, where computer entities are represented as nodes, and communications links between the computer entities are represented as lines joining the nodes. Every peer within the network has a stored network map, so that each peer computer has knowledge of the topology of all or part of the network. Individual selected computer entities may be provided with a network management service application 208. Since the management service is not a centralised service, but is distributed amongst one or a plurality of computers in the network, no one computer entity has overall control of network management, but the network management function is shared between one or more computers. In a minimum implementation, a single computer entity may be provided with the network management services application. In a saturated deployment, all computer entities within the network may be provided with their own individual network management services application. For a plurality of computers within a network, in between the extremes of on the one hand only one computer having a network management application, and on the other hand, all computers being provided with a network management application, there are various degrees of deployment of network management where a varying number of computers within the network may perform network management services. However, since a basic network management application may be the same for each computer entity, providing a minimum set of management services, each computer entity performs those management services without being subordinated to any other single computer entity within the network. In performing network management services, each peer computer entity may have equal authority to any other individual peer computer entity within the network. However, an individual computer entity may be subordinated to a group of other peer computer entities within the network acting together, provided those other peer computer entities cooperate to vote for subordinating a particular computer entity in the network.

A computer entity may be a member of more than one different peer to peer network. For example, a computer may be a member of a Gnutella network, and at the same time be a member of a Napster network, by virtue of downloading and running the Napster software which will allows the computer to download and run music files from other computers within the Napster network, as well as operating the Gnutella protocol.

On joining a peer to peer network, a computer entity loads a peer to peer protocol software, as well as a network management service program, wherein the peer to peer protocol program and the network management service program are intedinked such that whenever the computer entity takes part in the peer to peer network using the peer to peer protocol, the network management service program activates and runs as a background service. By packaging the peer to peer protocol together with a network management services application, incidences of free loading can be reduced, since every computer which participates in the peer to peer network, will also be providing a network management service at the same time, by virtue of the automatic operation of the management service program.

Each peer computer comprises a set of resources comprising a data processing capacity, a bit rate capacity, data storage capacity, and data content; a resource encapsulation layer for accessing the resources; a higher level service layer for providing a set of higher level services provided by the computer entity, for example provided by one or more services applications; and a set of core networking services comprising a network overlay service for enabling the computer to become a member in a peer to peer computer network, and a network management component which operates using the resources, when the resources are not being used by the higher level services, or in response to a service request received from another peer computer. Other core services may include accounting services, fault diagnosis services.

Figure 4:
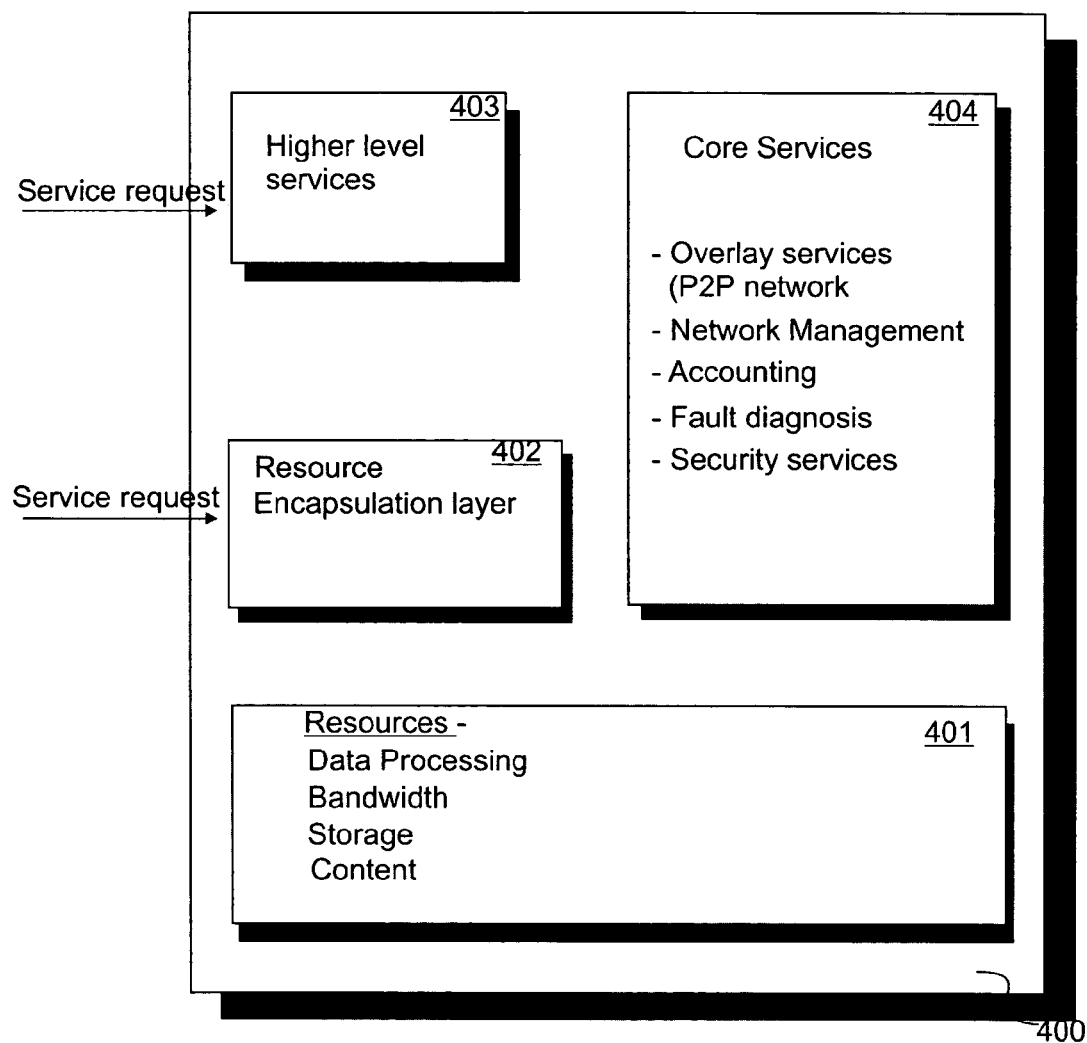
FIG. 4 illustrates schematically logical components of a computer entity according to a specific embodiment of the present invention.

Referring to FIG. 4 herein, there is illustrated schematically logical components of a computer entity which is enabled to provide network management services within a peer to peer network.

The computer entity comprises a set of resources 401, including data processing capability, bit rate capacity (bandwidth), data storage, and data content, for example music files, images files, text files; a resource encapsulation layer 402 which receives service requests from one or more peer computers and/or a user interface of the computer, the encapsulation layer encapsulating the details of supply of resources from the other peer computers or human users; a set of higher level services 403, which can be accessed by way of service requests received from other peer computer entities within the network, or from a human user of the computer entity, the higher level services comprising for example e-commerce services or the like; and a set of core services 404 including network management services, including network overlay services for establishing the computer as a member of a community of peer to peer connected computers in a peer to peer network, accounting functionality, fault diagnosis functionality and security services. The peer to peer overlay services govern how the peer computer entity communicates with other peer computer entities. Within the core services 404, the network management services and the peer to peer overlay functionality are linked, such that whenever the computer is engaging in a peer to peer network using the peer to peer overlay services, the network management functionality is automatically activated.

Each aspect of network management, for example fault management, exclusion of nodes, quarantine of nodes, controlling differential pricing for different types of node are controlled by a separate application program component in the network management program.

Figure 5:
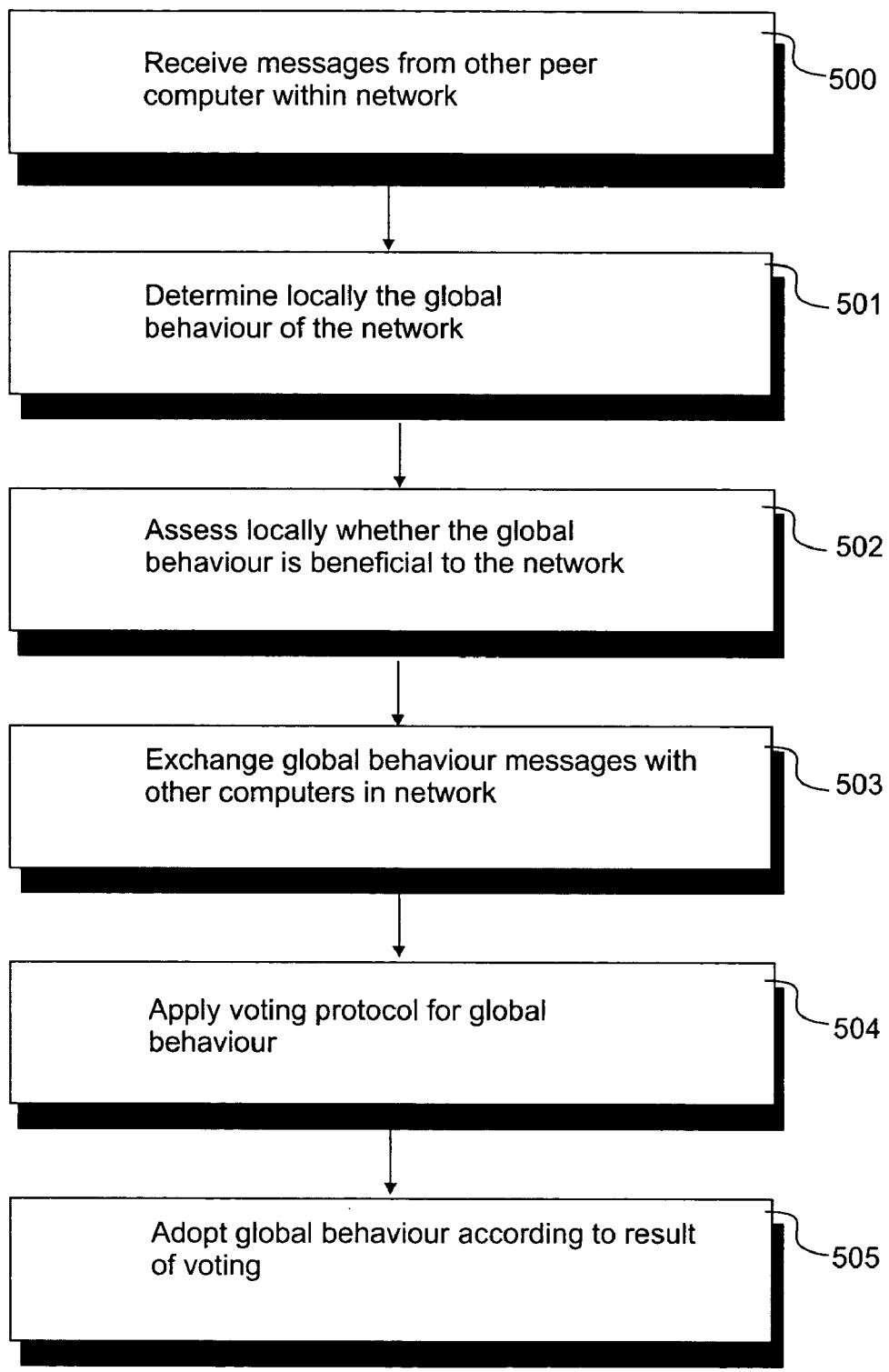
FIG. 5 illustrates schematically process steps carried out by a member of a peer to peer computer network for determining a local policy, and assessing a group policy of a plurality of members of the network.

Referring to FIG. 5 herein, there is illustrated schematically process steps carried out by a computer entity for assessing a global behavior of the network, from a plurality of messages received from other peer computer entities within the network. In process 500, the computer entity receives messages asynchronously from a plurality of other computer entities within the network. Each message describes a policy or action being taken by another peer computer entity with regard to its own behavior, for example with regard to its behavior relative to another computer entity within the network. In process 501, the local computer entity determines locally its own assessment of the global behavior of the network, from the plurality of messages received from the other peer computers within the network. In process 502, the computer entity assesses whether the global behavior of the whole network which the local computer entity has determined is beneficial to the network as a whole. In process 503, the local computer entity exchanges messages concerning the global behavior of the network with other peer computers within the network. The local peer computer entity sends out global behavior messages which describe the assessment of the local computer concerning an aspect of the global behavior of the network. Similarly, the local computer receives other global behavior messages from other peer computer entities in the network, which describes their assessments of global behavior of the network. In process 504, the local computer entity engages in a voting protocol with other peer computers in the network to determine amongst a group of peer computer entities which global behavior they will all adopt. In process 505, once the result of the voting is known, the local computer entity adopts a global behavior according to the result of the voting between all peer computer entities within the group. The peer computers' assessment of the global behavior in processes 501, and the subsequent voting procedures in processes 503-505 may be activated periodically by each computer entity, so that voting and modification of global behavior is an ongoing process throughout the network. Alternatively, all computer entities within a group may make an assessment and perform voting at a same time, so that global changes of behavior are assessed periodically throughout the network at intervals.

In general, within a network, the overall effect of the protocol applied locally at each computer entity is that:

Each computer entity forms its own policy regarding each other computer entity of which that local computer entity is aware, within the network.

Each local computer entity broadcasts its policy data to each other computer entity within the network, of which it is aware.

Each computer entity takes into account the received policy data from other computer entities within the network, in order to locally determine a global policy data for each of the computers in the network, and the applies that global policy data locally itself.

Types of decision which may be taken by local computers individually in the network, but having consideration for the polices applied at other computers include:

Whether to exclude a particular node from accessing a particular type of resource.

Whether to exclude or include a particular node in the network at all.

Whether to quarantine a particular node.

Whether to control access to communal resources.

Whether nodes are charged for accessing resources, and whether to charge different nodes different rates for accessing particular resources.

Whether to isolate a node which is downloading high level services or resources from many other nodes, but which is not providing any high level services or recourses itself.

Figure 6:
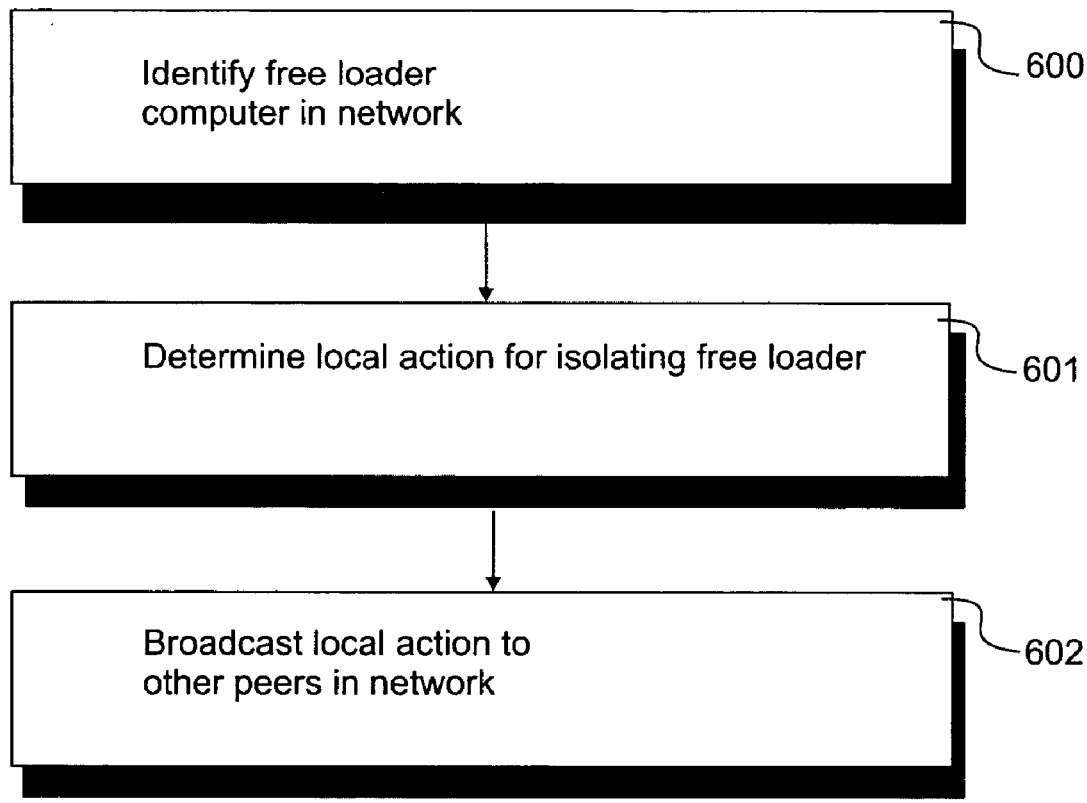
FIG. 6 illustrates schematically process steps carried out by a member of a peer to peer network for isolation of a free-loading member.

Referring to FIG. 6 herein, there is illustrated schematically process steps carried out by a peer computer entity for isolating another computer entity in the network, which may be freeloading. In process 600, the peer computer entity identifies a freeloader computer in the network. This is done by selecting a peer computer entity in the network, either randomly, or as part of a sequential selection process, and testing the selected computer entity to see if it is capable of providing resources. Any computer entities which, upon request, fail to provide a requested resource, or fail to acknowledge a test request, are identified as potentially being freeloaders. In process 601, the peer computer determines locally its own policy action towards the freeloader computer. That policy action may, for example, be to isolate the freeloader computer, and not to respond to any requests from the freeloader computer. In process 602, the peer computer entity broadcasts its own local action which it is adopting towards the freeloading computer entity to other peer computers in the network.

Since other peer computers are running the same process asynchronously and in parallel to the local computer entity, each node provided with a network management component formulates its own assessment of other peer computers within the network, determines locally its own action to be taken relating to specific other computer entities within the network, and broadcasts that information to other peer computer entities within the network. The broadcast takes the form of a message comprising a data field identifying the subject of the policy action, that is, identifying the freeloader computer, and a data field identifying the type of policy action which the local peer computer entity has adopted in relation to that freeloading computer entity.

The peer computer entity may adopt its own policy action locally, until such time as other peer computers within the network vote to override that policy, or may continue to adopt a previous policy until a vote on the new policy has been taken by other peer computer entities in the network.

Figure 7:
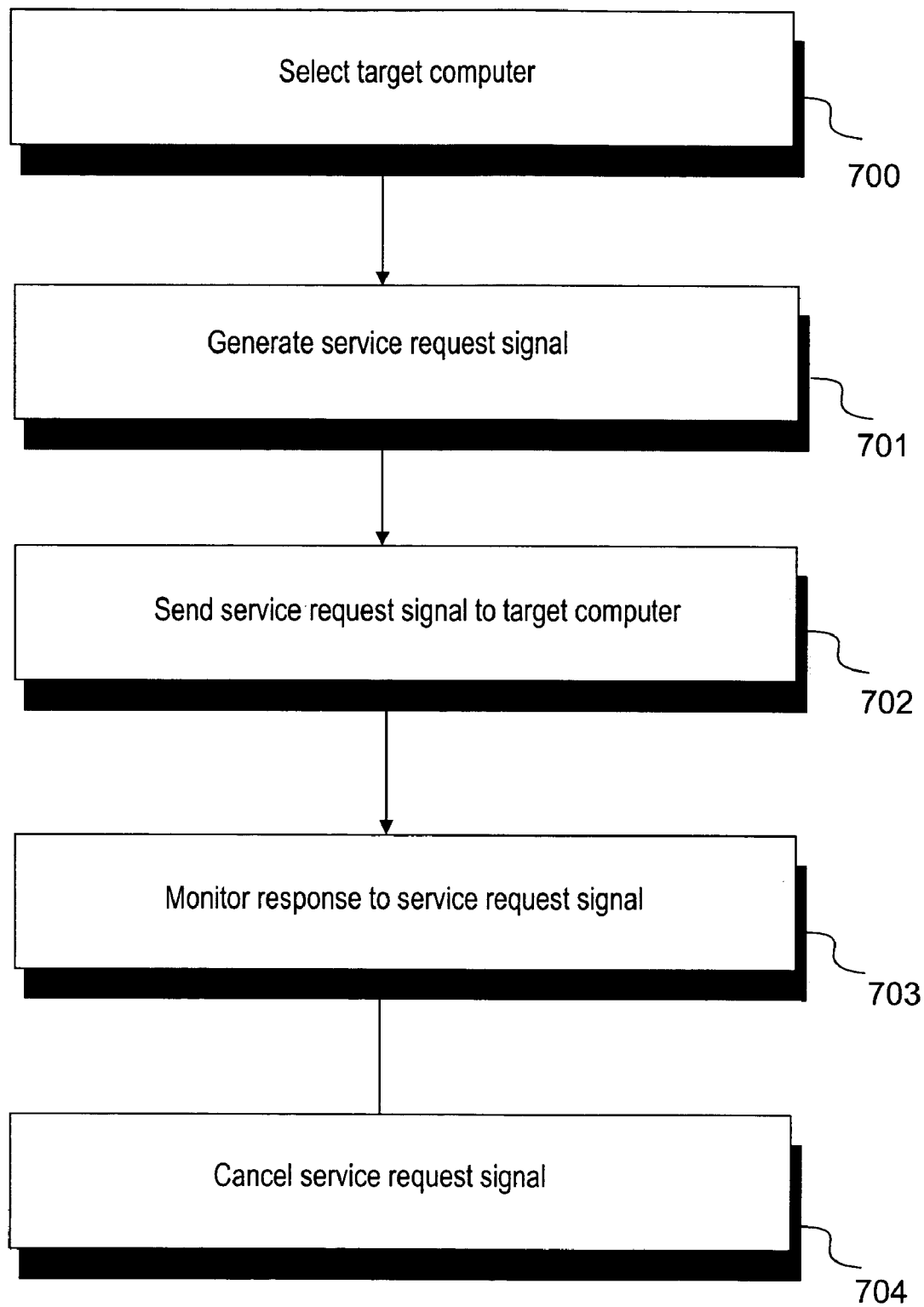
FIG. 7 illustrates schematically process steps carried out by a peer member for monitoring a target member.

Referring to FIG. 7 herein, there is illustrated schematically process steps carried out by a peer computer entity for monitoring another peer computer entity in a network. In process 700, the local peer computer selects a target peer computer, being another peer computer entity in the network. Selection may be random from a list of other connected peer computers in the network, or may be as a result of a sequential selection or selection according to a search pattern amongst a list of peer computer entities. In process 701, the local computer generates a service request signal, requesting a service from the selected target computer, and sends that service request to the target computer in process 702. In process 703, the local computer monitors the response to the service request signal. If the target computer entity responds to the test request signal positively, that is, by offering supply of a resource, then that target computer entity is not freeloading, and is capable, and ready to supply a service to other computers in the network. However, if no response is received, or if the service request is denied, then the target computer entity may either be busy, or may be freeloading. The target computer is then recorded within the local computer as being potentially a freeloading computer. To test whether the target computer entity is busy or is freeloading, the local computer entity may repeat the generating and sending of a service request signal to the target computer, to see if a positive response issues from the target computer for a second service request, and subsequent service requests. The mechanism for determining whether a computer entity is freeloading or is busy is an implementation specific design detail of the management program, that is, determining how many test signals are to be sent, how many positive or negative responses are to be taken in determining whether a target computer is freeloading or not, are all designable parameters.

After each service request signal, if a target computer entity responds to that signal, then it may be necessary to cancel the service request signal by sending a cancellation message to the target computer entity, so that actual utilisation of resources does not occur during the test, in process 704.

Each computer entity within the network carries out monitoring as a background operation of one or more other computer entities in the network. Consequently, all computer entities are continuously monitoring each other to see if any computer entity in the network is freeloading, and when any computer entity identifies a freeloader, it can locally isolate that freeloader, and send messages to other computer entities within the network, alerting other computer entities to the presence of a freeloader. The other computer entities in the network may vote upon a global action to be taken in respect of the freeloading computer entity, in particular whether to exclude that computer entity from the network or not.

Each computer entity within the network, may then adopt the global policy towards the entity.

Referring to FIG. 8 herein, there is illustrated schematically, data stored in the local database at a local computer entity, the data concerning characteristics and properties of other peer computer entities within a network. Each peer computer entity is identified by either its internet address and/or a user account number. The local computer entity stores a list of properties, property 1, property 2 ... property N, each property describing a particular aspect of operation of a peer computer entity within the network, and a set of one of more policies, policy 1-Policy N, which determines how the local computer will cooperate with other peer computers in the network, and how the local computer will vote within a group of peer computers to determine a global network behaviour. The policy information, determines how the local computer entity will treat each other peer computer entity in the network. For example a stored policy may be not to send any files to that particular peer computer entity, or not to receive any files from that particular computer entity, in a case where the other computer entity is suspected of having a virus.

Figure 9:
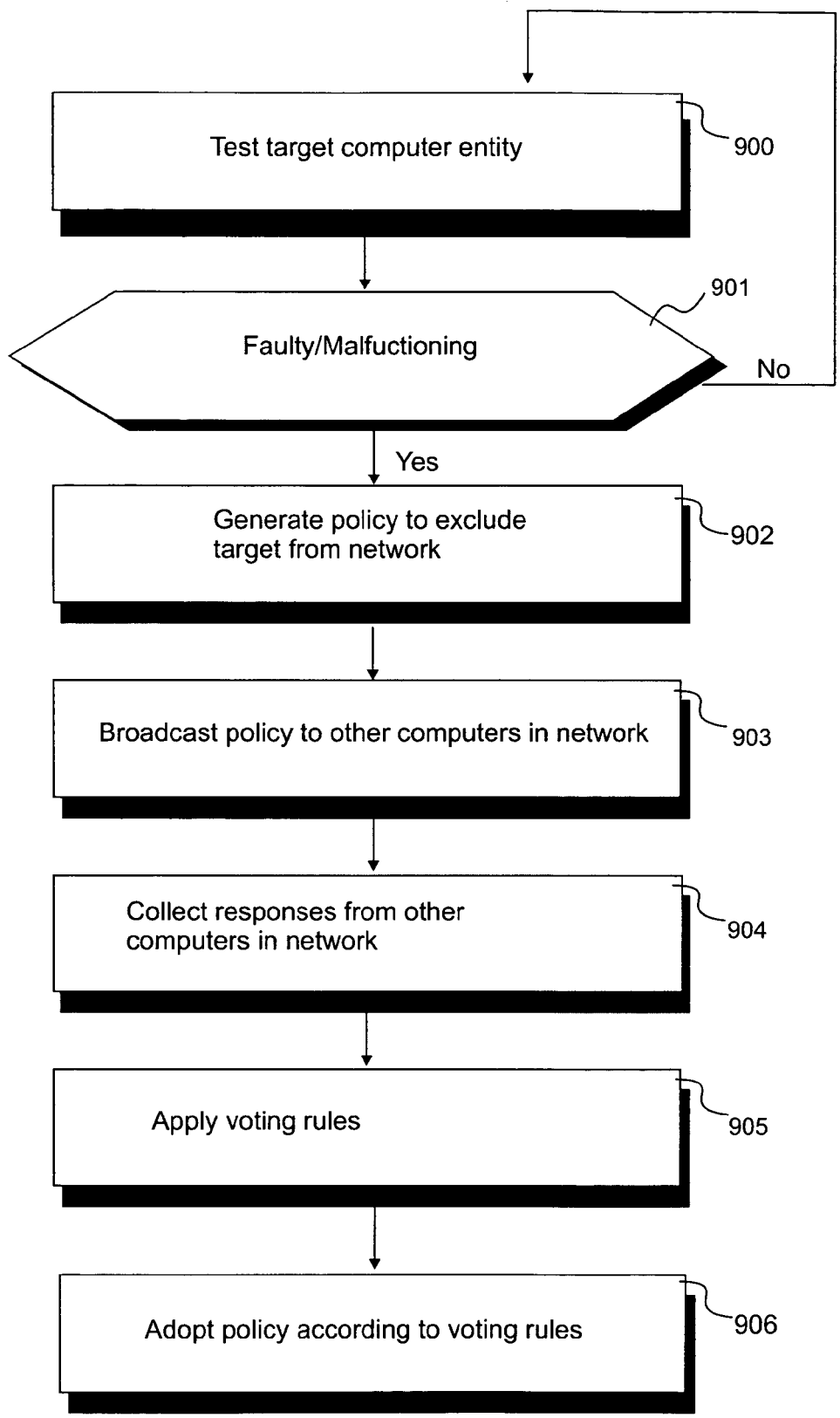
FIG. 9 illustrates schematically process steps carried out by a peer member for determining a local and global policy towards a specific target member of a peer to peer network

Referring, to FIG. 9 herein, an example of how a peer computer entity operates for an operation of assessing whether to exclude a target peer computer entity from the network now follows.

The local peer computer entity may test the target computer entity in process 900 for a particular parameter to be measured, for example, whether the target computer entity is faulty, or is freeloading. Various test procedures can be involved, such as requesting a file or service, or testing a received file for viruses. In process 901, if the target computer entity is tested to have a detrimental characteristic, such as being faulty or freeloading, then in step 902, the local computer generates a local policy towards the target computer entity, in this example the policy being to exclude the target computer entity from the network. The policy may be adopted from a set of nodes pre-stored in the management program to take account of various situations such as freeloading, or a virus. In process 903, the local computer entity broadcasts its local policy data concerning the target computer to all other computer entities in the network of which it is aware, to inform those computer entities of the local computer entity's local policy towards the target computer. In process 904, the local computer entity collects responses from other computers in the network, concerning their local policies towards the target computer. In process 905, the local computer entity applies a voting procedure comprising a set of stored voting rules, in which each of the responses received from the other computer entities in the network, concerning the target computer are considered, and resulting in an overall vote as to whether the target computer entity will be excluded from the network or not. The voting rules are implementation specific, and may be by a simple majority rule, or by a pre-set percentage number of the computer entities voting that the computer target be excluded from the network. In process 906, the local computer entity adopts as its local policy a policy which has been elected by the voting procedure carried out in process 905. For example, where the majority vote is in favor of retaining the target computer entity on the network, the local computer entity will follow the result of the majority vote, and even though it has tested the target computer entity to be faulty, it will apply the majority vote in order to retain that target computer entity in the local computer entity's own list of members of the peer network.

The local computer entity does not have to apply a global policy only as a result of a policy which the local computer has itself initiated but can adopt a policy initiated by another peer. For example instead of testing the target computer entity itself, the local computer entity could engage in the voting procedure, as a result of receiving a message from another computer entity, that the other computer entity's local policy is to exclude the target computer from the network.

A plurality of service requests are received at each node. Each node may monitor the number and type of service requests received from each other node in the network, and analyse those service requests, to see which other nodes in the network have a high demand for high level services, or content.

Whereas prior art network management systems are hierarchical and centralised, and generally focused on management of faults in computer networks, specific implementations are distinguished by applying network management in a peer to peer environment, by utilising otherwise under utilised resources on nodes within a network, by running network management services as a background operation during otherwise idle times of a node, and by applying network management to manage resources and content.

Further, specific implementations provide a method and apparatus for automatically taking action upon discovering imbalances in resource utilisation and resource supply within a peer to peer network.

The invention claimed is:

1. A method performed by a first computer entity in a peer to peer network, said method comprising:
   determining a local policy for management of a second computer entity in said peer to peer network;
   receiving, from a third computer entity in said peer to peer network, a message describing a policy
      determined by said third computer entity for management of said second computer entity; and
   determining from said policy determined by said third computer entity, and from said local policy, a
      network management policy to be applied by said first computer entity to said second computer entity.

2. The method as claimed in claim 1, further comprising:
   broadcasting said network management policy to a plurality of peer computers within said peer to peer network.

3. The method as claimed in claim 1, comprising:
   monitoring said second computer entity; and
   depending upon a result of said monitoring, adopting a pre-determined policy from a stored set of policies,
      and applying said pre-determined policy to said second computer entity.

4. The method as claimed in claim 1, wherein a said network management policy comprises a policy selected from the group consisting of:
   a policy for determining whether or not to place said second computer entity into quarantine;
   a policy for generating a virus alert message for alerting other computer entities in the peer to peer network that a said second computer entity has a virus;
   a policy for generating a fault alert message for alerting other computer entities in the peer to peer network that said second computer entity is faulty;
   a policy determining whether to exclude said second computer entity from accessing a particular type of resource;
   a policy for determining whether to exclude said second computer entity from the peer to peer network;
   a policy for control of access by said second computer entity to a communal resource; and a charging policy for charging said second computer entity for accessing a resource.

5. The method as claimed in claim 1, comprising applying a monitoring operation to said second computer entity, wherein said monitoring operation is selected from the group consisting of:
- a monitoring operation for remote virus scanning of said second computer;
- a monitoring operation for observing a group behavior of a group of target computer entities within said peer to peer network;
- a monitoring operation for detecting a security breach in said peer to peer network;
- a monitoring operation for detecting a performance problem of said second computer.

6. The method as claimed in claim 1, wherein said determining said network management policy comprises:
applying a voting protocol in which said first and third computer entities vote, and thereby adopt a common policy for said network management policy.

7. The method of claim 1, wherein said determining said network management policy includes considering whether said second computer entity allows said first computer entity to utilise a resource of said second computer entity.

* * * * *